United States Patent [19]
Yasuhara

[11] Patent Number: 4,636,677
[45] Date of Patent: Jan. 13, 1987

[54] DRIVE COIL WIRING STRUCTURE FOR BRUSHLESS MOTOR

[75] Inventor: Yukihiko Yasuhara, Kakuda, Japan

[73] Assignee: Alps Electric Co., Ltd., Japan

[21] Appl. No.: 767,184

[22] Filed: Aug. 19, 1985

[30] Foreign Application Priority Data

Aug. 17, 1984 [JP] Japan ................... 59-124676[U]

[51] Int. Cl.$^4$ .............................................. H02K 3/46
[52] U.S. Cl. .................................... 310/194; 310/42;
310/43; 310/71; 310/208; 310/259
[58] Field of Search ............. 310/40 MM, 46, 43, 71,
310/156, 268, 208, 68 R, 171, 194, 42, 45, 254,
259, 214; 336/185, 208

[56] References Cited

U.S. PATENT DOCUMENTS

| Re. 24,909 | 12/1960 | Dochterman | 310/43 X |
| 4,361,776 | 11/1982 | Hayashi | 310/268 |
| 4,374,336 | 2/1983 | Shimizu | 310/40 MM |
| 4,517,480 | 5/1985 | Muller | 310/268 |

FOREIGN PATENT DOCUMENTS

| 2161930 | 6/1973 | Fed. Rep. of Germany | 310/194 |
| 0041801 | 3/1977 | Japan | 310/43 |
| 0003201 | 1/1979 | Japan | 310/43 |
| 0023713 | 2/1980 | Japan | 310/194 |

Primary Examiner—R. Skudy
Attorney, Agent, or Firm—Guy W. Shoup

[57] ABSTRACT

In a brushless motor comprising a stator portion having a stator yoke on which a plurality of drive coils are mounted, and a rotor portion having a rotor yoke on which a ring-like rotor magnet is mounted, the rotor portion being arranged to be rotated by interaction between a current flowing in the drive coils and magnetic flux generated from the rotor magnet, disclosed is a drive coil structure provided with coil holders formed on the stator yoke through outsert molding for respectively positioning the drive coils on the stator yoke, and a protrusion respectively formed on each of the coil holders at its end surface opposed to the rotor magnet for preventing the drive coil from coming loose.

2 Claims, 6 Drawing Figures

DRIVE COIL WIRING STRUCTURE FOR BRUSHLESS MOTOR

BACKGROUND OF THE INVENTION

1. Field of the Invention

The present invention generally relates to a brushless motor suitable for use in a video apparatus, an audio apparatus, or the like, and more particularly to a wiring structure of drive coils mounted on a stator yoke at a stator portion in such a brushless motor.

2. Description of the Prior Art

Conventionally, such a brushless motor as shown in FIG. 5 has been widely used for driving a head cylinder of a VTR, or the like.

In FIG. 5, a brushless motor is provided with a rotor portion 1 and a stator portion 2.

The rotor portion 1 is constituted mainly by a cup-like rotor yoke 3, a ring-like rotor magnet 4 fixedly bonded to the inner bottom portion of the rotor yoke 3, a ring-like frequency generator magnet 5 (hereinafter, referred to as FG magnet) disposed inside the rotor magnet 4 and fixedly bonded to the inner bottom portion of the rotor yoke 3, and a rotary shaft 7 passed through the rotor yoke 3 as well as a connector member 6 at the center axis portion and secured thereto. The rotor magnet 4 and the FG magnet are divided into pieces which are circumferentially successively magnetized to be N-pole, S-pole, N-pole... S-pole and arranged to be exposed from above as shown in the drawing.

The stator portion 2 is constituted mainly by a disk-like stator yoke 8, a plurality of drive coils 9 mounted on the stator yoke 8, a disk-like FG basic plate 10 fixedly bonded to the drive coils 9, and a wired substrate 11 mounting drive circuit parts (not shown) and fixed to the stator yoke 8 above the stator yoke 8 by means of screws. An FG coil (not shown) constituted by digital conductive patterns circumferentially continuously connected is formed on the FG basic plate 10 and the FG coil is provided in the magnetic field between the FG magnet 5 and the stator yoke 8.

Two pulse generator magnets 12 and 13 (referred to as PG magnets) are fixedly bonded to the outer periphery of the rotor yoke 3 at opposite positions opposed to each other, that is angularly separated by 180 degrees from each other. The PG magnets 12 and 13 have outwardly exposed faces of magnetic poles different from each other. A PG head 14 for detecting magnetic flux from the PG magnets 12 and 13 is mounted on the stator yoke 8.

Fig.6 is a segmentary enlarged plan view showing the state in which the drive coils 9 have been mounted on the stator yoke 8. As shown in the drawing, a plurality of coil holders 15 each formed in a substantially trapezoidal shape in plan are projectingly provided through outsert molding on the stator yoke 8 at predetermined positions. Each of the drive coils 9 having a number of turns is positioned by a corresponding one of the coil holders 15 and fixedly bonded to the stator yoke 8. An inside wire terminal of each drive coils 9 is passed through a through hole 15a of the associated coil holder 15 and fixedly soldered to the wired substrate 11 and an outside wire terminal of the drive coil 9 is passed through the stator yoke 8 and fixedly soldered to the wired substrate 11.

In FIG. 5, illustrated are a lower cylinder 16 which constitutes a fixed side of a head cylinder of a VTR and a bearing 17 provided on the lower cylinder 16. The stator yoke 8 of the stator portion 2 is fixed on the lower surface of the lower cylinder 16 by screws and the rotary shaft 7 of the rotor portion 1 if fixedly attached to an upper cylinder (not shown) which is a rotary side of the head cylinder.

In the thus arranged conventional brushless motor, when the drive coils 9 are supplied with a drive current from a drive circuit provided on the wired substrate 11, electromagnetic force is generated by interaction between the drive current and magnetic flux from the magnetic pole faces of the rotor magnet 4, so that rotary force is generated in the rotor to thereby rotate the rotor portion 1. Consequently, counter electromotive force is generated in the FG base plate 10 due to changes in magnetic field because of rotation of the FG magnet 5 and taken out as a frequency signal, whereby the rotary speed of the rotor portion 1 is controlled to rotate at a fixed speed in response to the frequency signal. Upon rotation of the rotor portion, the PG head 14 successively receives magnetic flux from the PG magnets 12 and 13 which rotate together with the rotor yoke 3 and produces a PG pulse every 180 degrees in one revolution of the rotor portion 1, whereby the phase of the rotor portion 1 is detected on the basis of the PG pulse.

In the conventional brushless motor, however, there are disadvantages that the inside wire end of each drive coil 9 positioned by the coil holder is apt to come loose if tensile force acts thereon because there is no measure to prevent such tensile force, and therefore each drive coil 9 comes loose at the soldering of the wire terminals of the drive coil 9 to the wired substrate 11, or in the mounting of the stator portion 2 onto the lower cylinder 16.

SUMMARY OF THE INVENTION

An object of the present invention is to eliminate the disadvantage in the prior art.

Another object of the present invention is to provide a drive coil wiring structure for a brushless motor with proper workability in which drive coils can be prevented from coming loose.

In order to attain the objects, the drive coil wiring structure for the brushless motor according to the present invention is featured in that protrusions for preventing the coils from coming loose are respectively formed on the end surfaces of the coil holders provided through outsert molding on the stator yoke.

DETAILED DESCRIPTION OF THE INVENTION

Figure 1:
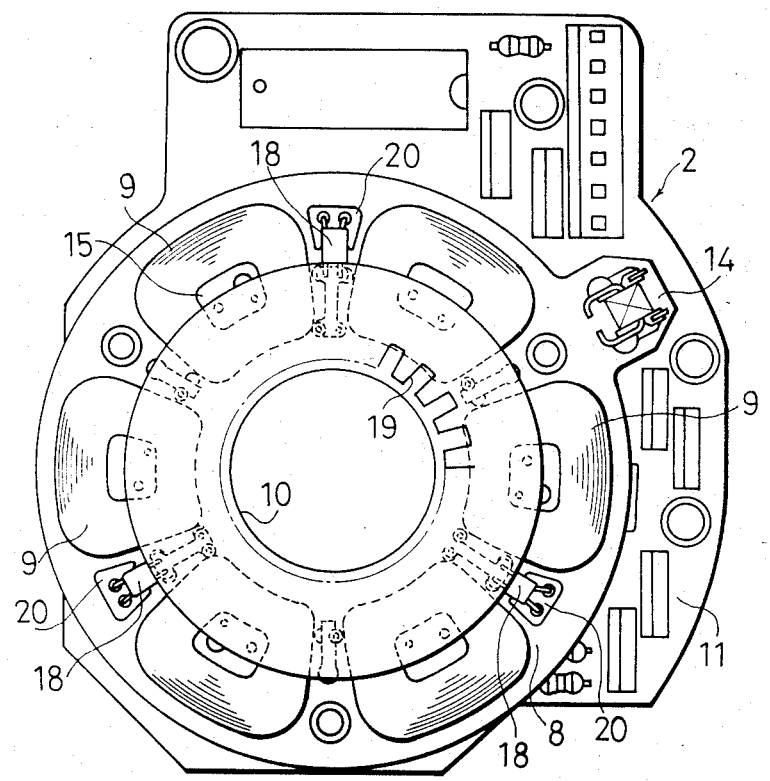
FIG. 1 is a plan view showing the stator portion of an embodiment of the drive coil wiring structure for a brushless motor according to the present invention.

Referring to the drawings, an embodiment according to the present invention will be described herenuder.

Figure 5:
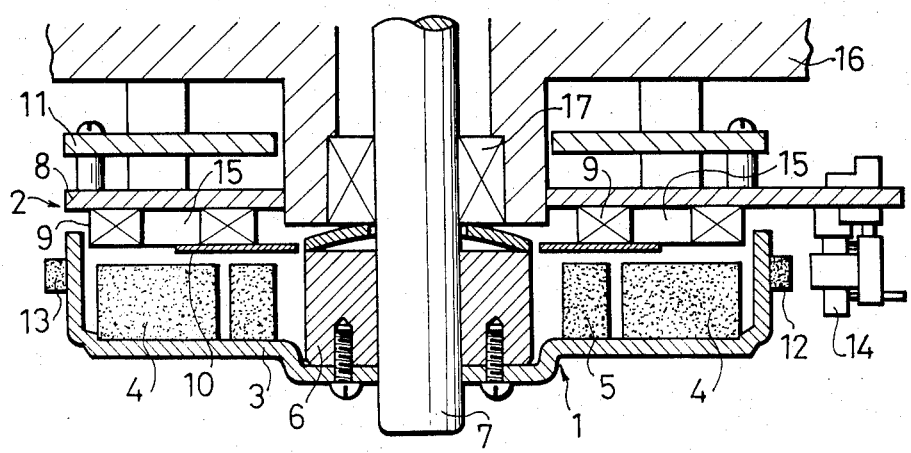
FIG. 5 is a segmentary longitudinal sectional view showing an example of the conventional brushless motor.
Figure 6:
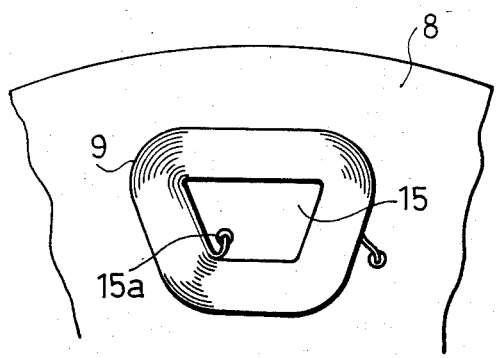
FIG. 6 is a segmentary enlarged plan view showing the brushless motor of FIG. 5 in the state in which the drive coils are mounted.

FIG. 1 is a plan view of the stator portion, and the parts corresponding to those shown in FIG. 5 are designated by the same reference numerals as used in FIG. 5. In FIG. 1, drive coils 9 positioned by respective coil holders 15 are bonded to a stator yoke 8 which is similar to that described above. A plurality of Hall elements 18 are mounted on the stator yoke 8 at predetermined intervals. A digital FG coil 19 is circumferentially continuously provided on the surface of an FG basic plate 10 which is similar to that described above and which is fixedly bonded to the surface of the drive coils 9 by double-sided adhesive tapes (not shown).

Figure 2:
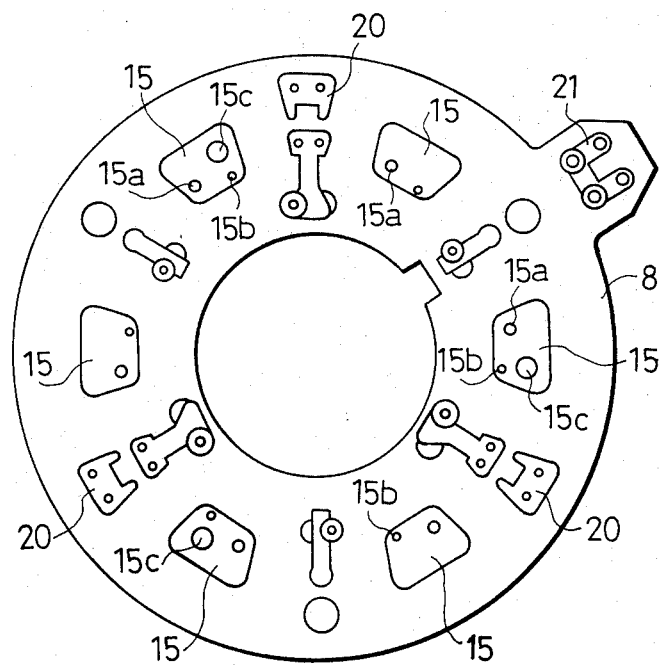
FIG. 2 is a plan view showing the yoke of FIG. 2.

FIG. 2 is a plan view of the stator yoke 8 shown in FIG. 1. In the drawing, there are provided the above-mentioned coil holders 15, Hall elements holders 20 for mounting the Hall elements 19, and a head holder 21 for mounting a PG head 14, these parts being integrally formed through outsert molding of a synthetic resin material.

Through holes 15a for guiding the respective inner side wire ends of the drive coils 9 to the wired substrate 11 are formed in the coil holders 15. Protrusions 15b for preventing the coils from coming loose are formed in the vicinity of the respective through holes 15a such that they have the same height from the stator yoke 8 respectively. Screw holes 15c are formed on one side of the coil holders 15.

Figure 3:
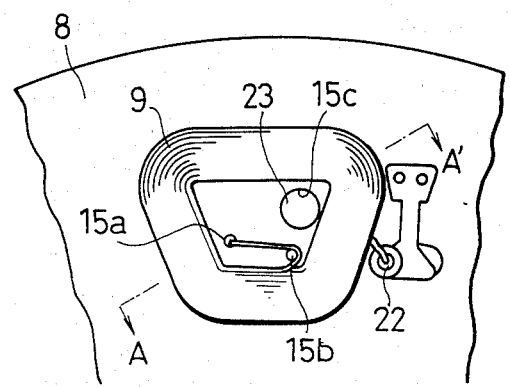
FIG. 3 is a segmentary enlarged plan view showing the state in which the drive coil is mounted on the stator yoke shown in FIG. 2.
Figure 4:
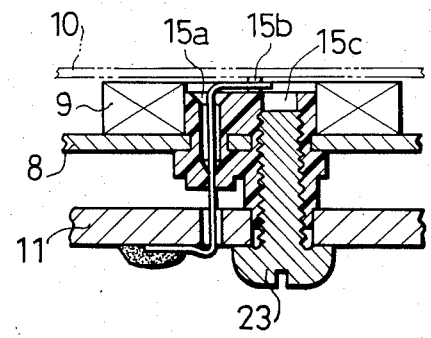
FIG. 4 is a longitudinal sectional view taken along line A—A' of FIG. 3.

FIG. 3 is a segmentary enlarged plan view showing the state in which the drive coils 9 are mounted on the coul holders 15, and FIG. 4 is a longitudinal sectional view taken along A—A' line of FIG. 3. As shown in the drawings, each drive coil 9 having a number of turns formed in a substantially trapezoidal shape in plan is fittingly inserted through the coil holder 15, and fixedly bonded to the stator yoke 8. The inner side wire end of each drive coil 9 is wound around the protrusion 15b by a half turn and led to the wired substrate 11, while the outer side wire end of the same drive coil 9 is passed through a through hole 22 formed through outsert molding in the stator yoke 8 and led to the wired substrate 11. Thereafter, both the inner and outer wire ends are fixedly soldered to the wired substrate 11. As seen in FIG. 4, the wired substrate 11 is fixed to the stator yoke 8 by screwing screws 23 into the screw holes 15c.

In the manner as described above, after the drive coils 9 have been fixed to the stator yoke 8 at the predetermined positions and wired, the FG basic plate 10 is bonded onto the drive coils 9 by means of the double-sided adhesive tapes (see FIG. 1). At this time, as shown in FIG. 4, the protrusions 15b come into contact with the lower surface of the FG basic plate 10, so that FG basic plate 10 is bonded substantially parallel to the stator yoke 8 and a magnetic gap between the FG basic plate 10 and the FG magnet is held in a predetermined distance. Further, each drive coil 9 can be prevented from coming off over the top of the protrusion 15b by the FG basic plate 10, so that the action for preventing the drive coil from coming loose is made more secure by this protrusion 15b.

The operation of the thus arranged brushless motor of the embodiment are the same as the above-mentioned conventional one and the explanation is omitted.

As described above, according to the present invention, the drive coils, particularly the inner side ends of the respective drive coils, can be prevented from coming loose by means of the protrusions integrally provided on the respective coil holders, so that the durability of the drive coils can be improved.

What is claimed is:

1. In a brushless motor comprising a stator portion having a stator yoke on which a plurality of drive coils are mounted on one side thereof and a circuit wired substrate mounted on the other side of said stator yoke, and a rotor portion opposed to said stator portion having a rotor yoke on which a ring-like rotor magnet is mounted, said rotor portion being arranged to be rotated by interaction between a current flowing in said drive coils and magnetic flux generated from said rotor magnet, an improved drive coil structure comprising:
coil holders formed on said stator yoke through outsert molding for respectively positioning said drive coils on said stator yoke;
a protrusion respectively formed on each of said coil holders on an end surface thereof facing said rotor magnet for preventing the drive coil from coming loose; and
a through hole formed in each coil holder in the vicinity of said protrusion, one end of said drive coil being wound around said protrusion by a half turn and passed through said through hole in said coil holder and the other end of said drive coil being passed through another through hole formed in said stator yoke for connection to said wired substrate.

2. A drive coil structure according to claim 1, wherein said motor includes a frequency generator plate mounted over said drive coils of said stator yoke, said protrusions of said coil holders projecting to the same height from said stator yoke in contact with a lower surface of said plate for providing a gap between said plate and said drive coils and preventing the ends of said drive coils from coming over the respective protrusions.

* * * * *